Feb. 14, 1967 W. L. LEWIS 3,304,253
RECOVERY OF PHENOLIC MATERIALS
Filed Dec. 14, 1962
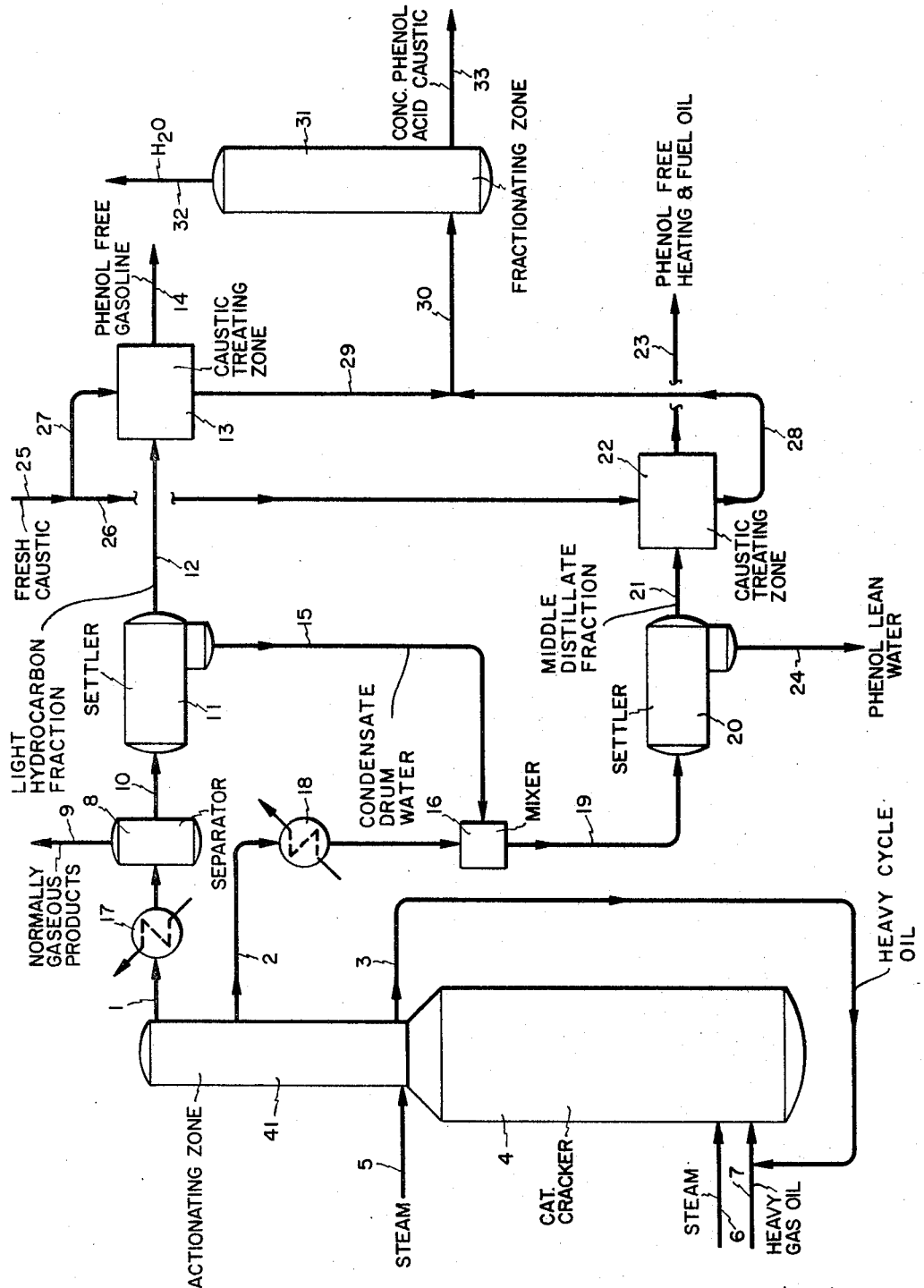
Inventor
WILLIAM L. LEWIS
By Perry Carvellas
Patent Attorney

United States Patent Office 3,304,253
Patented Feb. 14, 1967

3,304,253
RECOVERY OF PHENOLIC MATERIALS
William L. Lewis, Baton Rouge, La., assignor to Esso Research and Engineering Company, a corporation of Delaware
Filed Dec. 14, 1962, Ser. No. 244,812
11 Claims. (Cl. 208—97)

This invention relates to the treatment of refinery waste water so that it may be disposed of safely. More particularly, it relates to a method of treating phenolic waste water from a catalytic cracking process to recover valuable phenolic materials and to obtain a waste water low enough in phenolic contaminants to be safely disposed of by discharging it into available large bodies of water. Specifically, the invention relates to a process of extracting phenolic materials from catalytic distillate condensate water by contacting the water with a light catalytic middle distillate oil, which oil selectively extracts phenolic materials, and subsequently caustic treating the middle distillate oil to remove the extracted phenolic materials.

Phenolic waste waters arise in the fluid catalytic cracking process during the distillation of phenolic petroleum oils employing steam to vaporize the less volative components of the cracked oils. Steam is normally introduced into the stripping zone of a fractionation tower and may also be introduced into the vaporization zone together with the feed to the tower. In addition, water is added to the fractionating tower to dilute ammonia formed by the catalytic cracking reaction to a pH of less than 10 to prevent attack of the ammonia on the condensing equipment. Steam from these sources is condensed with the distillation products and separated therefrom. Relatively large amounts of phenolic materials are produced by the catalytic cracking reaction and are distilled overhead with the light ends fraction. The steam absorbs vaporized phenol, strips phenol from the hydrocarbon vapor, and in addition on cooling and condensation of the light ends fraction additional phenol is extracted from the oily layer that separates. The oily layer has an equilibrium amount of phenolic materials and cannot be used for subsequent extraction of phenol from waste water. The separated water layer is saturated with phenolic materials. The light ends fraction, after removal of the normally gaseous hydrocarbons, is generally caustic treated to remove phenolic materials.

Normally a gas oil is catalytically cracked in a catalytic cracker to produce three major streams: a light ends stream containing normally gaseous hydrocarbons up to hydrocarbons boiling in the gasoline range; an intermediate boiling stream containing middle distillate hydrocarbons, such as heating oil, diesel oils, fuel oil, etc.; and a third heavy fraction boiling above about 850° F. which is normally recycled to the catalytic cracker to extinction. The first fraction is referred to as light ends, the intermediate fraction is known and referred to as light catalytic cracking cycle oil (LCCO), and the third fraction is normally referred to as heavy catalytic cracking cycle oil (HCCO). As previously stated, the light ends fraction is saturated with phenolic materials; the intermediate fraction, however, has relatively little phenolic materials present, and the heavy fraction has substantially no phenols present. Normally, the light ends fraction, after separation from the condensed water, is subjected to caustic treating to remove phenolic materials. The intermediate fraction is also normally subjected to caustic treatment to remove phenolic materials, and as previously stated the heavy fraction is recycled to the catalytic cracker. The condensate water separated from the light ends fraction is saturated with phenolic materials and removal of phenolic materials from the condensate water utilizing the intermediate middle distillate cracked product (LCCO) from the catalytic cracker as an extraction solvent is the subject matter of the present invention.

The present invention is directed to the reduction of phenolic content of catalytic distillate condensate drum water. The invention is not limited to the removal of any particular type phenolic material and may be used successfully to remove mono-hydroxyphenols, poly-hydroxyphenols, mono-nuclear aromatic phenols, polynuclear aromatic phenols, substitution products thereof, naphthenic acids, and the like. The invention can be used in connection with catalytic distillate condensate drum water containing various concentrations of phenolic material from very dilute to highly concentrated. Normally, concentrations of 10 p.p.m. of phenols or greater are treated. This invention is particularly suited to the reduction of the phenolic content of catalytic distillate condensate drum water since, generally, phenol in this stream is relatively dilute and cannot be normally treated by other processes known in the art. However, considerable advantage is obtained in the reduction of phenolic content of catalytic distillate condensate drum water where the concentration of phenol is quite high. This is true since the invention, as in most single stage extraction processes, normally does not effect complete removal of phenols from waste liquors. Accordingly, the percentage of removal is greatest in connection with aqueous liquors containing high concentrations of phenolic materials. Therefore, the operational cost of the present invention does not increase with increasing phenolic content of the waste liquors.

The disposal of catalytic distillate condensate drum water containing appreciable amounts of phenolic bodies is a problem which has been of some concern to many refineries. Such liquors are produced in relatively large quantities in the catalytic cracking of petroleum hydrocarbons in which process a considerable amount of phenolic materials is produced. Formerly, the phenolic waters were disposed of by direct or indirect discharge into public waterways without previous treatment. However, in view of the adverse effect of phenolic materials on biological life and in view of the objectional odor and taste imparted to drinking water by phenolic materials, due to the increasingly large quantities of these materials disposed of, it has become necessary to curtail the amount of phenolic waters which can be discharged to local waterways. Also, direct disposal of these materials into waterways represents a loss of possible product credit by throwing away the phenolic materials which, if concentrated, would be a saleable product. One method of concentrating phenolic materials is by caustic treating the stream in which phenolic materials are contained. However, phenolic materials present in a catalytic distillate condensate drum water are generally so dilute that normal methods of withdrawing these phenolic materials cannot be used. For example, caustic treating of the aqueous stream is not suitable. However, caustic treating of a hydrocarbon stream having a sufficiently high concentration of phenolic materials would allow to be extracted into the caustic most of the phenolic materials present in the petroleum stream. The concentration of the spent caustic stream by evaporation of water would then produce a highly concentrated caustic material containing large amounts of phenolic materials. This concentrate can be easily marketed. The concentrated caustic is treated to spring the phenolic materials to obtain the phenol and naphthenic acids which are used in chemical synthesis processes.

Numerous treating operations have been suggested for removing or reducing the phenolic content of catalytic distillate condensate drum water, such as oxidation and chlorination. However, previously employed processes have met with only limited approval, particularly in instances where extremely large quantities of such liquors are involved and/or where high phenolic concentrations are present, because of the high initial capital outlay, high operational costs, and/or limitations with respect to the maximum phenolic content of waters which may be successfully treated by such process. More recently it has been suggested to contact aqueous industrial liquors containing phenolic materials with crude fractions at elevated temperatures whereby the phenolic materials present in the aqueous liquors are selectively extracted by the crude material and the salt present in the crude washed out and extracted by the aqueous liquors. The crude material containing the absorbed phenolic material is then normally separated in a pipestill into fractions, which fractions are sent to various refinery processes. This means of removing phenolic materials from catalytic distillate condensate drum water is not satisfactory in that the phenolic materials remain in the crude and on distillation into various fractions phenols are present in these fractions. Also, where the distillation is carried out by steam distillation, additional distillate condensate drum water is formed so there is very little net removal of phenolic materials from distillate condensate drum water. Therefore, it is not satisfactory in accordance with the present invention to use a crude oil to selectively extract phenolic materials from the catalytic distillate condensate drum water. In the same vein, it is not suitable to use a heavy catalytic cycle oil to selectively extract phenolic materials since this heavy catalytic cycle oil is reintroduced by recycle to the catalytic cracker and would reintroduce phenols into the catalytic cracker fractionating tower and allow a buildup of phenolic materials in the tower and a continuous production of catalytic distillate condensate drum water containing phenols since the phenols reintroduced to the tower would be distilled out and stripped by steam. Again, there would be no net reduction of phenol in the catalytic distillate condensate drum water from the system.

Another method suggested by the prior art is to absorb phenolic materials into a crude oil, separate the crude oil into fractions by distillation whereby most of the phenolic material would be withdrawn in a particular fraction and this fraction would be subjected to catalytic hydrogenation, which catalytic hydrogenation apparently destroys the phenols by conversion to hydrocarbons and to water. If this method were used, however, hydrogenation equipment, hydrogenation catalyst, and hydrogen would be required and also no phenolic materials would be recovered as a saleable product.

In accordance with the present invention, a gas oil obtained from a suitable crude source is introduced into a fluidized catalytic cracker. The gas oil has a boiling range of 200 to 1200° F. The catalytic cracker is operated at a temperature range of 890 to 960° F. and a pressure range of 20 to 30 p.s.i.g. using a silica-alumina catalyst. Steam is introduced along with the feed to control the catalyst reaction, and the catalytically cracked products are taken overhead and are distilled in a fractionating column with steam. Normally, three fractions are removed—a light ends fraction containing normally gaseous hydrocarbons and gaseous products as well as liquid hydrocarbons boiling up to about the gasoline range; a second fraction containing hydrocarbons boiling in the middle distillate range is removed and a heavy fraction boiling above about 850° F. is removed, which heavy fraction is normally recycled to the catalytic cracker feed.

The light ends fraction is saturated with phenolic materials since the phenolic materials generally boil in this range, and because the steam used to strip and to fractionate the hydrocarbons strips out and extracts phenolic materials from the heavier fraction and passes overhead with the light ends fraction. This stream is cooled and condensed and separates into two phases, a hydrocarbon oil phase and an aqueous liquid phase. The aqueous liquid phase is the catalytic distillate condensate drum water and is saturated with phenolic materials as is the hydrocarbon phase.

The second fraction which will hereinafter be referred to as LCCO, i.e., light catalytic cycle oil, contains hydrocarbons boiling in the middle distillate range. The concentration of phenolic materials in this fraction is relatively small though phenolic materials are present, but there is sufficient absorptive capability of this fraction to absorb substantial amounts of phenolic materials. There is normally a considerable amount of aromatic compounds in this stream which is desirable since the aromatic compounds assist in the absorption of phenolic materials from the aqueous fraction. However, it is undesirable to have too high a concentration of aromatic compounds because these materials will dissolve in the aqueous stream and contaminate the aqueous stream much the same way as phenolic materials.

The third stream, or heavy end stream, contains substantially no phenolic materials and is normally recycled to the catalytic cracker. Generally, the first and second streams are separately treated with caustic, which caustic materials selectively extract phenolic materials.

In accordance with the present invention, the second stream, or the LCCO stream, is intimately contacted with the condensate water containing phenolic materials in such proportions as to extract 50–95% of the phenolic materials present. The thus phenol-enriched LCCO is then sent to caustic treatment as before and the phenolic materials are recovered in the spent caustic. The spent caustic from this treatment is then combined with the spent caustic from the light ends stream and concentrated and sold. The concentrate contains a high concentration of phenolic materials as well as a high concentration of caustic.

The heavy catalytic cycle oil is not suitable for use to absorb the phenols as it would merely recycle the absorbed phenolic material back to the catalytic cracker and would not efficiently remove the phenolic materials from the system. Also, it would cause a phenolic buildup in the catalytic cracker and fractionating tower.

Since relatively large volumes of LCCO are contacted with relatively small volumes of phenolic water, transfer of phenols from the water to the LCCO is substantial and most all of the phenolic materials are removed from the water into the hydrocarbon stream. The condensate water recovered is accordingly considerably reduced in phenolic content and generally can be safely discarded into neighboring lakes or rivers or may be reused satisfactorily within the refinery. The contact of the condensate distillate drum water with the middle distillate or LCCO hydrocarbon stream is normally carried out at slightly elevated temperatures and atmospheric pressures. The temperatures and pressures are not critical except that the contact should be maintained in the liquid phase and temperatures should be below that at which the hydrocarbons in the LCCO deteriorate, and also below that at which the phenolic materials in the water condensate vaporize. Normally, the temperature of condensation of the overhead fraction and of the middle distillate fraction is controlled such that the temperatures of the condensates in both fractions are suitable for carrying out the phenolic extraction with the middle distillate and no additional heat need be added either to the catalytic distillate condensate drum water or to the middle distillate petroleum stream, that is, the LCCO. After intimately mixing the LCCO and the catalytic distillate condensate drum water, these are passed to a settler where they settle by gravity or other suitable means and efficient separation is obtained.

One of the more important features of the present invention is cutting the light ends fraction and a middle distillate fraction at such a point that a substantial portion of the phenolic materials pass into the light ends fraction and end up in the catalytic distillate condensate drum water and relatively little phenolic materials are present in the middle distillate fraction. By so doing, an efficient separation in the extraction of the phenolic materials from the catalytic distillate drum water can be obtained by extraction with the middle distillate oil which can absorb substantial amounts of phenolic materials from the condensate drum water.

This invention requires very little additional equipment and little or no process changes since both the liquid hydrocarbons from the light ends fraction and the liquid hydrocarbons from the middle distillate fraction are normally caustic treated to remove phenolic materials. The only additional step involved in the present invention is mixing of the middle distillate petroleum fraction and the catalytic distillate condensate drum water, allowing them to settle, and then treating the separated petroleum fraction in a manner in which it was normally treated, that is, by caustic treating. The phenol-lean water is merely removed and can be sent to sewerage or used again in the refinery. Therefore, by adding a single process step and one relative inexpensive piece of equipment and an orifice mixer, a substantial savings can be achieved in the recovery of valuable phenolic materials and a major problem of disposal of phenolic waste waters is solved.

The figure of the drawing represents the preferred embodiment of the invention which is illustrated schematically and shows how the catalytic distillate condensate drum water is obtained from the fluidized catalytic cracking process as well as the selective extraction with the middle distillate fraction of the phenolic materials from the distillate drum water and the caustic treatment of the light ends fraction and the middle distillate fraction.

The overhead or first stream to be taken from the catalytic cracker, taken at an end point of 350 to 450° F., preferably of 420 to 430° F., is saturated with phenolic materials at the conditions of fractionation and phenolic content of this stream after condensation will be about 700 to 1100 p.p.m. and, generally, about 850 to 950 p.p.m. This stream contains normally gaseous hydrocarbon products, such as ethane, ethylene, methane, propane, butane, and hydrocarbon materials up through the gasoline range. Stream 2 generally contains some phenolic materials but usually so few phenolic materials that a substantial amount of phenolic materials can be absorbed into this stream when contacted with the catalytic distillate condensate drum water. This stream will generally have a phenolic concentration of about 150 to 200 p.p.m. The aromatic concentration of this stream is relatively important in that the higher the aromatic concentration, the more phenolic materials that can be absorbed in this stream. Usually the aromatic concentration is about 10 to 40%. It is, however, undesirable to have too high a concentration of aromatic materials, or for that matter to use a stream consisting essentially of aromatic materials to absorb the phenolic materials from the condensate drum water since with high concentrations of aromatic materials a considerable amount of aromatic materials pass into solution into the condensate drum water. Aromatic materials are just as objectionable in the drum water as are phenolic materials. The boiling range of this stream is usually about 250 to 800° F., and preferably about 375 to 700° F. The third stream from the catalytic cracker, as previously stated, is the heavy catalytic cycle oil and is normally recycled to the catalytic cracker and usually has a boiling range of about 600 to 1200° F. This stream contains little or no phenolic materials. Generally, this stream will be recycled to extinction. This stream, however, prior to recycle may be treated to remove metallic contaminants.

The catalytic distillate condensate drum water separated by condensation and settling from the light ends stream, will usually have a phenolic concentration of 100 to 600 p.p.m., generally 300 to 400 p.p.m. This stream is saturated with phenolic materials as is the liquid hydrocarbon fraction separated by settling.

In extracting the phenolic materials from the condensate drum water, the middle distillate stream or the LCCO stream is intimately contacted through a suitable mixing means, for example, an orifice, with the condensate waste water, and the phenolic materials present are selectively extracted. Generally, about 50 to 95% of phenolic materials are removed, depending on the ratio of hydrocarbon oil to waste water, normally 70 to 90% of phenolic materials are removed, and preferably 75 to 85% of phenolic materials are removed. The ratio of middle distillate solvent extracting oil to waste water is generally 25/1 to 3/1 and can be 20/1 to 10/1, but preferably is 17/1 to 12/1 to obtain maximum removal of phenolic materials with desirable ratios of middle distillate solvent to waste water. The contacting is carried out at a temperature of 75 to 175° F. and preferably 110 to 130° F. and at a pressure of 15 to 100 p.s.i.g., preferably 60 to 70 p.s.i.g.

The temperatures and pressures are not critical except within the operating limits of the contacting and selective solvent extraction. Usually the temperature at which the respective streams are obtained from the process is satisfactory and additional heat is not necessary. However, these conditions are regulated so that the contacting and selective extraction is carried out in the liquid phase. By virtue of the present invention, dilute phenolic concentrations of the catalytic distillate condensate drum water can be concentrated so that they may be handled in accordance with common refinery practices without substantial investment in equipment and expense in operating procedures.

The operation of the invention may be understood more fully by detailed reference to the attached drawing which illustrates the preferred embodiment of the invention. In describing the invention in referring to the drawing, numerous pumps, heat exchange equipment, valves, detailed separating means, etc., have been omitted in order not to overly complicate the drawing.

In accordance with the present invention a heavy gas oil obtained from a suitable source is introduced through line 7 into fluidized catalytic cracker 4. The heavy gas oil has a boiling range of about 200 to 1200° F. and is contacting at a temperature of about 890 to 960° F. and a pressure of 20 to 30 p.s.i.g. with silica-alumina catalyst in the cracker. Steam is introduced in the cracker through line 6 to control the cracking reaction and through line 5 to carry out the steam distillation of the cracked products. The cracked products pass upward through steam cracker 4 and through fractionating section of the cracker 41, in which fractionating section the cracked products are separated into streams 1, 2, and 3. The light ends fraction, with an end point in a range of 420 to 430° F., is withdrawn through line 1 together with a substantial amount of stripping and fractionating steam, which gaseous products are condensed in indirect heat exchange condenser 17 and the liquid products introduced to separator 8 wherein the normally gaseous products are taken overhead through line 9. The normally liquid products are taken through line 10 and introduced into settler 11 wherein the normally liquid hydrocarbons saturated with phenolic materials separate by settling and are withdrawn through line 12 and the catalytic distillate condensate drum water saturated with phenolic materials separates by settling and is withdrawn through line 15.

The normally liquid light end products in line 12 are introduced into caustic treating zone 13 wherein fresh caustic is introduced through lines 25 and 27, and countercurrently contacted with the hydrocarbons. Phenolic materials present in the hydrocarbons are selectively extracted and absorbed in the fresh caustic. The caustic and the hydrocarbon materials are separated by conventional means and the phenol-free light ends products withdrawn through line 14 and the spent caustic withdrawn through line 29.

A middle distillate fraction of (LCCO) fraction is withdrawn through line 2 and is cooled by indirect heat exchange means in condenser 18 whereby the materials are condensed and introduced at a temperature of 110 to 130° F. into mixer 16 where they are intimately mixed with catalytic distillate condensate drum water saturated with phenolic materials which is introduced through line 15. The LCCO fraction boils in the range of 375 to 700° F., has a phenol concentration of 150 to 200 p.p.m. and an aromatic concentration of 10 to 40%. The intimately mixed water and hydrocarbon stream are withdrawn through line 19 and fed to settler 20 where they are allowed to settle by gravity. In this settler the hydrocarbon materials rise to the top and the aqueous layer goes to the bottom of the settler, and the hydrocarbon layer containing substantially all of the phenolic materials from the aqueous condensate stream is withdrawn through line 21. The aqueous material, or catalytic distillate condensate drum water, substantially free of phenolic materials, is withdrawn through line 24. By contacting the distillate drum water with the middle distillate fraction from the catalytic cracker, 70 to 90% of phenolic materials are removed from the middle distillate fraction by contacting the fraction with the ratio of middle distillate to water of 20/1 to 10/1. This contacting is carried out at the pressure of 60 to 70 p.s.i.g., which is sufficient to maintain the materials in a liquid phase. Phenol-lean water stream in line 24 has a concentration of phenolic materials of about 75 to 125 p.p.m.

The phenol-fat hydrocarbon stream in line 21 is introduced into a conventional caustic treating zone 22. The phenol-fat middle distillate fraction is countercurrently contacted with fresh caustic which is fed through lines 25 and 26. The caustic solution selectively removes from the hydrocarbon streams phenolic materials and the hydrocarbon and caustic streams are allowed to settle in the conventional manner. The phenol-free middle distillate stream is withdrawn through line 23 and the spent caustic containing substantially all of the phenolic materials previously in the hydrocarbon stream is withdrawn through line 28. The spent caustic in line 28 is combined with the spent caustic in line 29 obtained from the light ends fraction and is taken through line 30 into fractionating zone 31 wherein spent caustic is concentrated by heating and removal of water overhead through line 32. The concentrated caustic is removed through line 33 and has a concentration of caustic materials to 18 to 28° Bé, a concentration of phenolic materials of 15 to 25 wt. percent. This concentrated caustic material is saleable. The hydrocarbon materials removed from the catalytic cracker in line 3 are referred to as heavy catalytic cycle oil and this material is recycled to the feed. The heavy catalytic cycle oil has a boiling range of about 600 to 1200° F. and has substantially no phenolic materials, i.e., less than about 5 to 10 p.p.m.

The concentrated caustic material containing high concentrations of phenolic materials are sold as such and can be acid treated to spring the phenolic materials, which phenolic materials are used for various chemical synthesis processes. The caustic may be disposed of or regenerated and sold back to the refiner as a fresh caustic stream for treating hydrocarbon materials. The middle distillate stream, or the LCCO stream, which is used as a selective solvent to remove phenolic materials from the catalytic distillate condensate drum water, after removal of the phenolic materials by caustic treating, can be advantageously blended into various petroleum products to produce kerosene, heating oil, diesel oil, jet fuel oils, and heavy heating oils and are sold as such. These streams are substantially free of phenolic materials.

The invention is further illustrated by the following example:

A middle distillate, or light catalytic cycle oil, removed from the fluidized catalytic cracker having the physical properties illustrated below in Table I is intimately contacted with a catalytic distillate condensate drum

*Table I*

| | |
|---|---|
| A.P.I. gravity | 27.1–32.1 |
| Centi-stokes viscosity at 100° | 2.22–3.24 |
| Centi-stokes viscosity at 130° | 1.68–2.34 |
| Boiling range, ° F. | 375 to 650 |
| Phenolic content, p.p.m. | 175 |
| Aromatic content, wt. percent | 30 | water containing 350 p.p.m. of phenolic materials at various ratios to determine the weight percentage of phenolic materials extracted by a single contacting. The results obtained are illustrated below in Table II.

*Table II*

| Treat ratio, oil to water: | Percent of phenolic material removed from distillate water |
|---|---|
| 2 to 1 | 36.4 |
| 3.5 to 1 | 55.5 |
| 6 to 1 | 66.3 |
| 10 to 1 | 72.4 |
| 12.5 to 1 | 74.5 |
| 15 to 1 | 78.2 |
| 20 to 1 | 87.5 |
| 25 to 1 | 95.0 |

It can be seen from Table II that by utilizing the ratio of LCCO to catalytic distillate condensate drum water of ratios as low as 6/1 that 66% of phenolic materials present may be extracted. Ratios as high as 20/1 will extract almost 90% of the phenolic materials present. The ratio of LCCO to distillate water used would depend on the amount of phenolic materials present in a distillate water. This ratio will be determined by the amount of distillate water to be treated and the amount of LCCO available as well as the limitations on the phenolic content of the water which may be disposed of in conventional disposal means, for example, to sewerage. Contacting in this example was carried out at a temperature of about 110° F. and at atmospheric pressures.

From the above example it can be readily seen that an efficient, economical, simple method of removing phenolic materials from catalytic distillate condensate drum water was obtained. The recovery of this phenolic material in preparation of a saleable product is also described. Thus, in accordance with the present invention, two problems are solved: (1) the disposal of catalytic distillate condensate drum water containing high concentrations of phenolic material, and (2) the recovery of phenolic material to produce a saleable product. These results are obtained with substantially no additional process costs and with little or no additional equipment costs whereby the recovery of the saleable product more than offsets the costs involved in recovering the phenolic materials from the condensate drum water. The treatment of the LCCO with caustic to remove phenolic materials is normally carried out; therefore, this does not constitute an additional cost in the process.

An important aspect of the invention is that little modification of the existing equipment is required. Normally, the sole modification of the conventional equipment required to practice the invention is to provide the necessary lines and valves and pumps for conducting the phenolic waste waters to the LCCO stream and to provide mixing and separation of the stream. Such modifications may be made at low cost. A major advantage of the invention is that it permits a substantial reduction in the phenolic content of large volumes of industrial waste liquors. This result is achieved with only nominal capital investment and little or no operational costs. A still further advantage of the invention is that it converts substantial proportions of the phenolic material in the waste water, which would normally be lost, to saleable products by transfer thereof to the LCCO oil which conventionally undergoes the caustic treatment, and recovery of these phenolic materials in the caustic stream. Several additional advantages accrue in using the LCCO oil, one of which is that this material is of such viscosity that it is easy to handle and does not introduce phenolic materials back into the system since this material is subsequently caustic treated. By using the LCCO stream rather than a crude stream containing large amounts of inorganic salts, the aqueous stream is obtained free of phenols and free of inorganic salt materials.

It is understood, of course, that numerous modifications of the invention may be practiced without departing from the spirit thereof or the scope of the appended claims.

What is claimed is:

1. A process comprising the steps of catalytically cracking a petroleum oil containing phenolic materials, distilling the products of said cracking in contact with steam in a fractionation zone to separate and recover a light boiling fraction, an intermediate boiling fraction, and a heavy fraction, cooling and condensing said light fraction, separating said light fraction into an oil phase saturated with phenolic materials and an aqueous phase saturated with phenolic materials; withdrawing said aqueous phase from said oil phase and contacting said aqueous phase with said intermediate fraction to selectively extract phenolic materials from said aqueous phase, allowing said aqueous phase and said intermediate fraction to separate; withdrawing an aqueous phase therefrom substantially free of phenolic materials and withdrawing an oil phase therefrom substantially increased in phenolic materials.

2. A process comprising the steps of catalytically cracking a petroleum oil containing phenolic materials into lighter products, distilling the products of said conversion in contact with steam to separate a light fraction containing normally liquid products and saturated with phenolic materials, and an intermediate fraction containing from about 100 to 200 parts per million of phenolic materials and a heavy fraction containing substantially no phenolic materials; cooling and condensing said light fraction, separating said light fraction into a light liquid hydrocarbon fraction saturated with phenolic materials and an aqueous fraction containing about 100 to 600 parts per million of phenolic materials; withdrawing said light liquid hydrocarbon fraction and caustic treating said light fraction to remove phenolic materials; withdrawing said aqueous liquid fraction and contacting said aqueous liquid fraction with said intermediate fraction to selectively extract said phenolic materials from said aqueous liquid fraction into said intermediate fraction; separating said mixture into an aqueous phase and into an intermediate boiling fraction phase whereby the thus treated aqueous phase has been reduced in phenolic concentration to less than 100 parts per million; withdrawing the intermediate boiling fraction substantially increased in phenolic materials extracted from said aqueous phase and subsequently contacting said intermediate boiling fraction thus enriched in phenolic materials with caustic to substantially reduce the phenolic concentration of said intermediate boiling fraction; combining the caustic extract from the normally liquid products from the light fraction with the caustic extract from the intermediate fraction and concentrating the thus extracted phenolic materials from both fractions to obtain a concentrated caustic material containing a high concentration of phenolic materials.

3. The process of claim 1 wherein said intermediate fraction as withdrawn from the fractionation zone contains relatively little phenolic materials and a minor amount of aromatic materials.

4. The process of claim 1 wherein said light fraction is cooled and condensed and an aqueous and an oil phase are separated, said oil phase is treated to remove normally gaseous hydrocarbon products and said normally liquid products are caustic treated to remove phenolic materials.

5. The process of claim 1 wherein said intermediate boiling fraction, after contact with said aqueous phase saturated with phenolic material and extraction of phenolic materials from said aqueous phase, is caustic treated to remove phenolic materials.

6. The process of claim 1 wherein the spent caustic from treating the light and intermediate hydrocarbon materials is combined, heated to remove excess water, and concentrated to obtain a concentrated phenolic caustic material.

7. A process for reducing the phenolic concentration of catalytic condensate water which comprises catalytically cracking a gas oil fraction containing phenolic materials distilling the products of said conversion in contact with steam, separating a light ends fraction and a heavy fraction and an intermediate boiling range oil fraction, cooling and condensing said light ends fraction and separating a light ends oil phase containing phenolic materials and an aqueous phase containing phenolic material, contacting said intermediate boiling oil fraction with said aqueous phase with a ratio of oil to aqueous phase of 20/1 to 10/1 thereby selectively extracting from said aqueous phase 70 to 90% of the phenolic materials present into said oil phase, separating said oil extract phase from said aqueous phase whereby the concentration of phenolic materials in said oil phase is substantially increased and the concentration of phenolic materials in said aqueous phase is substantially decreased.

8. The process of claim 7 wherein the light ends fraction has constituents boiling in the range of about 50 to 450° F. and the intermediate boiling oil fraction has constituents boiling in the range of about 375 to 800° F.

9. The process of claim 2 wherein the boiling range of the light fraction is about 50 to 450° F. and the boiling range of the intermediate fraction is about 375 to 700° F. and the boiling range of the heavy fraction is in the range of 600 to 1200° F.

10. The process of claim 2 wherein the ratio of intermediate boiling fraction contacted with said separated aqueous phase is 25/1 to 3/1.

11. The process of claim 10 wherein 50 to 95% of the phenolic materials present in said separated aqueous phase are selectively extracted by said intermediate boiling fraction.

References Cited by the Examiner

UNITED STATES PATENTS 2,134,390  10/1938  Greensfelder et al. ___ 260—627
2,785,120   3/1957  Metcalf _____ 260—627

LEON ZITVER, Primary Examiner.

H. G. MOORE, Examiner.

W. B. LONE, Assistant Examiner.